United States Patent [19]

Hari et al.

[11] Patent Number: 5,071,967
[45] Date of Patent: Dec. 10, 1991

[54] DISAZO COMPOUNDS CONTAINING LONG-CHAIN ALKYL ESTER RADICALS OR ALKYLAMIDE RADICALS

[75] Inventors: Stefan Hari, Reinach; Jost von der Crone, Arconciel, both of Switzerland

[73] Assignee: Ciba-Geigy Corporation, Ardsley, N.Y.

[21] Appl. No.: 654,140

[22] Filed: Feb. 11, 1991

[30] Foreign Application Priority Data

Feb. 15, 1990 [CH] Switzerland .................. 484/90-0

[51] Int. Cl.$^5$ ............................................ C09B 29/10
[52] U.S. Cl. ................................. 534/651; 534/739; 534/820; 534/830; 534/862; 534/874
[58] Field of Search ............. 534/651, 739, 820, 862, 534/874, 830

[56] References Cited

U.S. PATENT DOCUMENTS

| | | | |
|---|---|---|---|
| 3,137,688 | 6/1964 | Ronco | 260/174 |
| 3,562,249 | 2/1971 | Schnabel et al. | 260/184 |
| 4,003,886 | 1/1977 | Müller | 260/176 |
| 4,065,488 | 12/1977 | Chou et al. | 260/467 |
| 4,689,403 | 8/1987 | Ronco | 534/820 |
| 4,946,948 | 8/1990 | Hari et al. | 534/651 |

OTHER PUBLICATIONS

Chem. Abstract-CA102(8): 63589u, "Yellow Azo Condensation Pigments".
Chem. Abstract-CA54: 16843h.
Chem. Abstract 113: 80523n (1990).

*Primary Examiner*—Howard T. Mars
*Assistant Examiner*—Jessica H. Nguyen
*Attorney, Agent, or Firm*—JoAnn Villamizar

[57] ABSTRACT

Compounds of the formula I

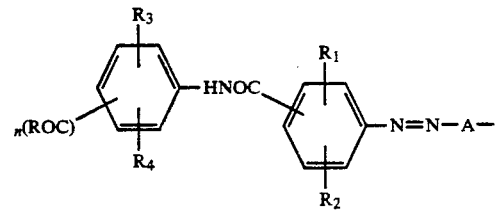

-continued

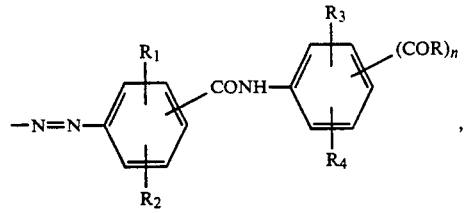

in which R is a radical of the formula —OR$_5$ or —NHR$_5$, A is a radical of the formula II or III

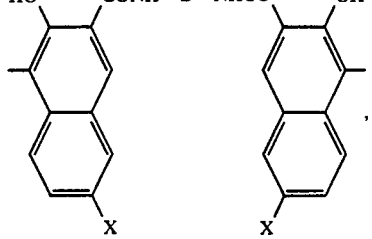

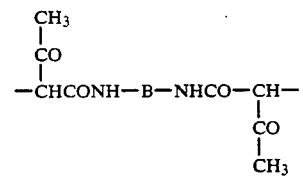

in which B is a radical of the formula

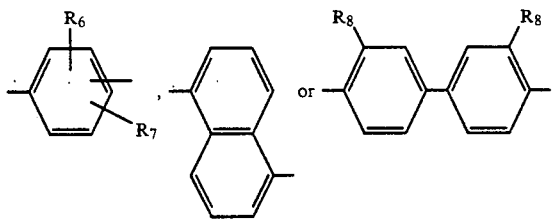

in which n is the number 1 or 2, R$_1$ and R$_3$ independently of one another are —H or Cl, R$_2$ and R$_4$ independently of one another are —H, halogen, —NO$_2$, —CN, C$_1$-C$_4$alkyl, C$_1$-C$_4$alkoxy, —CF$_3$, C$_2$-C$_5$alkoxycarbonyl, or —CONH-phenyl, —NHCO-phenyl or phenyloxy which is unsubstituted or substituted on the phenyl nucleus by one or two chlorine atoms or one or two methyl, methoxy or ethoxy groups, R$_5$ is alkyl having at least 10 C atoms, R$_6$ and R$_7$ independently of one another are —H, halogen, —NO$_2$, —CN, —CF$_3$, C$_1$-C$_4$alkyl or C$_1$-C$_4$alkoxy, R$_8$ is —H, —Cl, —Br, —CH$_3$ or —OCH$_3$ and X is —H, —Br, —OCH$_3$, —CN or —NO$_2$, are particularly suitable as pigments for coloring polyolefins.

7 Claims, No Drawings

DISAZO COMPOUNDS CONTAINING LONG-CHAIN ALKYL ESTER RADICALS OR ALKYLAMIDE RADICALS

The present invention relates to novel disazo compounds containing long-chain alkyl ester radicals or alkylamide radicals and their use for colouring high molecular weight organic material, in particular polyolefins.

Azo pigments containing ester radicals have already been known for a long time. Red disazo pigments are described, for example, in U.S. Pat. No. 3,137,688 and U.S. Pat. No. 4,689,403, while yellow disazo compounds are disclosed, for example, in U.S. Pat. No. 4,003,886 and U.S. Pat. No. 4,065,488. One of the main features of the compounds listed in these patents is that they contain at least four alkyl ester radicals, in which the alkyl radical contains up to a maximum of 4 C atoms. Disazo pigments containing alkylamide groups are described, for example, in U.S. Pat. No. 3,562,249. Although such pigments in general have good pigment properties, they do not always meet the current requirements of the art, for example because of a lack of heat resistance and/or inadequate dispersibility.

Further disazo pigments which contain at least two long-chain alkyl ester radicals or alkylamide radicals, are particularly suitable for colouring high molecular weight organic materials, in particular polyolefins, and have an improved dispersibility, a lower tendency to bloom and good pigment properties are furthermore described in European Patent Application No. 358,604.

It has now been found that disazo pigments containing at least two long-chain alkyl ester radicals or alkylamide radicals in the diazo radical containing two benzene nuclei surprisingly are particularly suitable for colouring high molecular weight organic materials, in particular polyolefins, in which they exhibit an improved resistance to migration and weathering and fastness to blooming, coupled with good general pigment properties, in particular heat resistance and dispersibility.

The present invention accordingly relates to compounds of the formula I

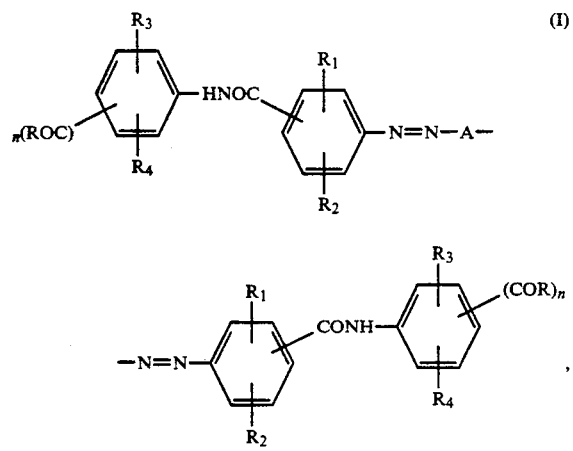

in which R is a radical of the formula —OR$_5$ or —NHR$_5$, A is a radical of the formula II or III

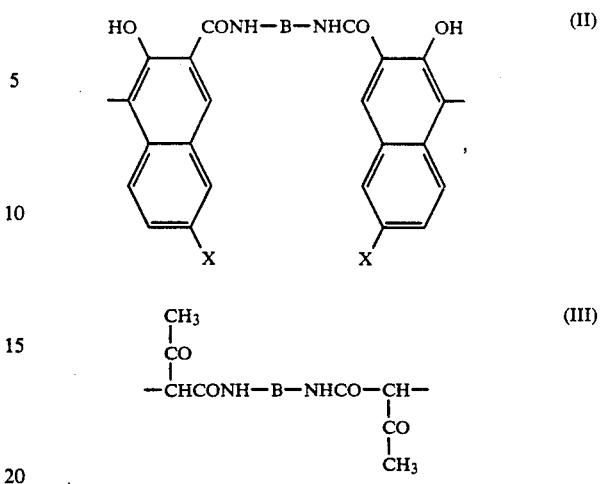

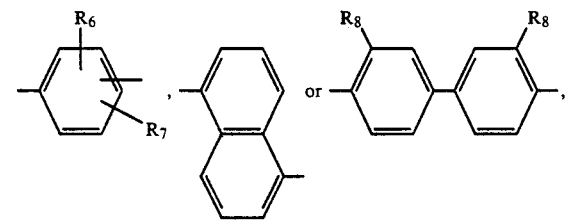

in which B is a radical of the formula in which n is the number 1 or 2, R$_1$ and R$_3$ independently of one another are —H or Cl, R$_2$ and R$_4$ independently of one another are —H, halogen, —NO$_2$, —CN, C$_1$-C$_4$alkyl, C$_1$-C$_4$alkoxy, —CF$_3$, C$_2$-C$_5$alkoxycarbonyl, or —CONH—phenyl, —NHCO—phenyl or phenyloxy which is unsubstituted or substituted on the phenyl nucleus by one or two chlorine atoms or one or two methyl, methoxy or ethoxy groups, R$_5$ is alkyl having at least 10 C atoms, R$_6$ and R$_7$ independently of one another are —H, halogen, —NO$_2$, —CN, —CF$_3$, C$_1$-C$_4$alkyl or C$_1$-C$_4$alkoxy, R$_8$ is —H, —Cl, —Br, —CH$_3$ or —OCH$_3$ and X is —H, —Br, —OCH$_3$, —CN or —NO$_2$.

Halogen in the groups listed above is fluorine, bromine or, in particular, chlorine.

C$_1$-C$_4$Alkyl R$_2$, R$_4$, R$_6$ and R$_7$ is methyl, ethyl, n-propyl, isopropyl, n-butyl, isobutyl or tert-butyl.

C$_1$-C$_4$Alkoxy R$_2$, R$_4$, R$_6$ and R$_7$ is, for example, methoxy, ethoxy, n-propoxy, isopropoxy, n-butoxy or tert-butoxy.

C$_2$-C$_5$Alkoxycarbonyl R$_2$ and R$_4$ is, for example, methoxycarbonyl, ethoxycarbonyl, n-propoxycarbonyl, isopropoxycarbonyl, n-butoxycarbonyl or tert-butoxycarbonyl.

X is, in particular, a hydrogen atom.

The radicals B in the formulae II and III are derived, for example, from m-phenylene- or, in particular, from p-phenylenediamines of the following formulae

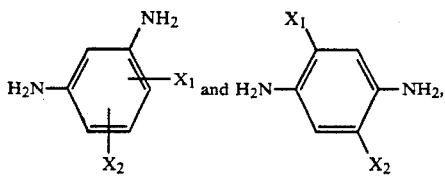

in which $X_1$ and $X_2$ independently of one another are —H, halogen, —$NO_2$, —CN, —$CF_3$, $C_1$-$C_4$alkyl or $C_1$-$C_4$alkoxy.

$C_1$-$C_4$Alkyl, $C_1$-$C_4$alkoxy and halogen $X_1$ and $X_2$ are as already defined above.

Examples of such diamines are: 1,4-diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,4-diamino-2,5-dimethoxybenzene, 1,4-diamino-2,5-diethoxybenzene, 2-chloro-5-methyl-1,4-phenylenediamine, 2-chloro-5-methoxy-1,4-phenylenediamine, 2-methyl-5-methoxy-1,4-phenylenediamine, 1,3-diaminobenzene, 1,3-diamino-2-methylbenzene, 1,3-diamino-4-chlorobenzene and 1,3-diamino-4-methylbenzene.

Examples of diamines which are derived from the radical of the formula

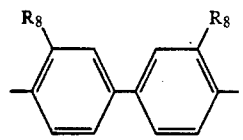

are: 3,3'-dichlorobenzidine, 3,3'-dibromobenzidine, 3,3'-dimethylbenzidine and 3,3'-dimethoxybenzidine.

Alkyl having at least 10 C atoms (in the radical —$OR_5$ or —$NHR_5$) is branched or straight-chain alkyl, for example n-decyl, n-dodecyl, n-tridecyl, isotridecyl, n-tetradecyl (myristyl), n-pentadecyl, n-hexadecyl, 1-methylpentadecyl, n-octadecyl, n-eicosyl, n-tetracosyl, n-hexacosyl, n-triacontyl or n-pentacontyl.

Alkyl $R_5$ is preferably $C_{12}$- to $C_{35}$alkyl, in particular $C_{12}$- to $C_{18}$alkyl, or mixtures thereof; such alkyl radicals are derived, for example, from long-chain alkanols and from the commercially available mixtures, known as Alfols, of unbranched primary alcohols which essentially contain alkyl groups always with an even number of C atoms and are used as starting substances. The alkyl groups in the alcohols are called "alfyl" for example alfyl-$C_{12}$ or alfyl-$C_{14}$.

Preferred compounds of the formula I are those in which the formula I has the following structure

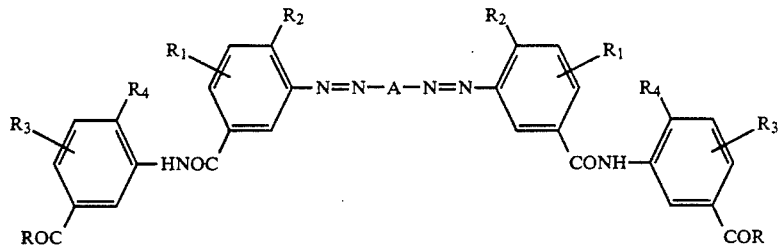

and the groups R, $R_1$, $R_2$, $R_3$, $R_4$ and A are as defined above.

Particularly preferred compounds of the formula I are those in which the formulae II and III have the following structures

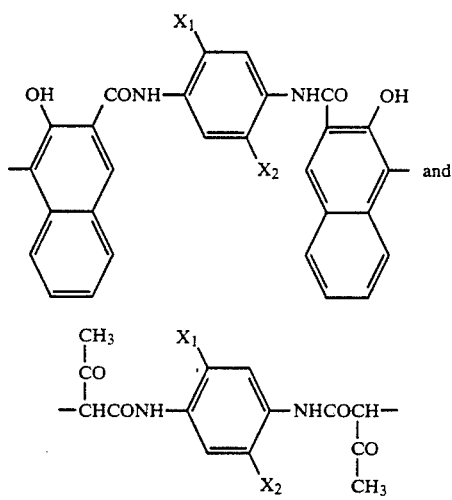

and $X_1$ and $X_2$ are as defined above.

Particularly preferred compounds are those of the formula IV

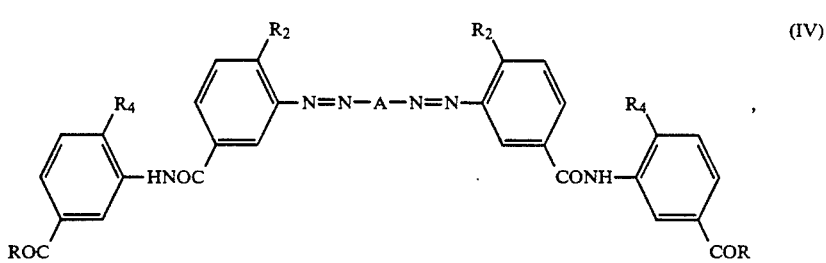

in which A is a radical of the formula V or VI

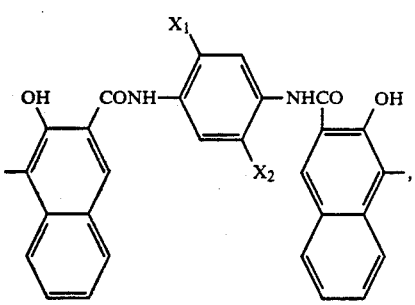

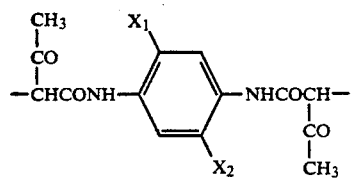

in which R is a radical of the formula —OR$_5$ or —NHR$_5$, R$_2$ and R$_4$ independently of one another are —H, —Cl, —CH$_3$, —OCH$_3$, —OC$_2$H$_5$, —COOCH$_3$, —COOC$_2$H$_5$ or —OC$_6$H$_5$, R$_5$ is C$_{12}$-C$_{35}$alkyl and X$_1$ and X$_2$ independently of one another are —H, —Cl, —CH$_3$, —OCH$_3$ or —OC$_2$H$_5$.

R in the formula IV especially preferably is a radical of the formula —OR$_5$.

In the formula IV, A is preferably a radical of the formula V, but in particular a radical of the formula V in which, for this preferred meaning, R$_2$ is —Cl, —CH$_3$ or —OCH$_3$, but in particular —Cl, R$_4$ is —Cl, —CH$_3$, —OCH$_3$, —COOCH$_3$ or —COOC$_2$H$_5$, but in particular —Cl, R$_5$ is C$_{12}$-C$_{18}$alkyl and X$_1$ and X$_2$ independently of one another are —H, —Cl, —CH$_3$ or —OCH$_3$.

Compounds which are likewise particularly preferred are those of the following formula

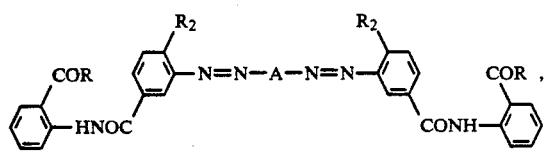

in which A is a radical of the above formula V or VI, in which X$_1$ and X$_2$ independently of one another are —H, —Cl, —CH$_3$, —OCH$_3$ or —OC$_2$H$_5$, R$_2$ is —Cl or —CH$_3$ and R is a radical of the formula —OR$_5$ or —NHR$_5$, in which R$_5$ is C$_{12}$-C$_{18}$alkyl.

The compounds of the formula I are preferably symmetrical compounds in which the two diazo components containing two benzene nuclei are identical. Asymmetric compounds in which the two diazo components differ also fall within the definition of the above formula I.

The compounds of the formula I can be prepared by processes which are known per se, for example:

a) by condensation of 2 mol of a carboxylic acid halide, in particular a chloride, of the formula

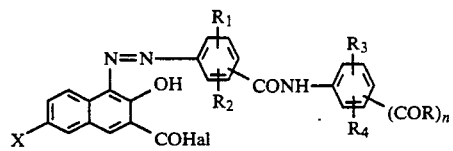

with a diamine of the formula H$_2$N—B—NH$_2$, in particular of the formula

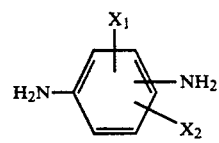

in accordance with for example, U.S. Pat. No. 4,689,403, and by condensation in accordance with U.S. Pat. No. 4,065,448 of 1 mol of a disazodicarboxylic acid dihalide of the formula

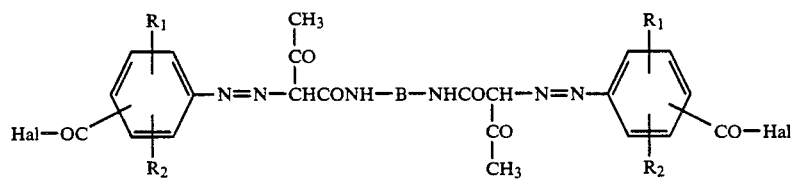

with 2 mol of an amine of the formula

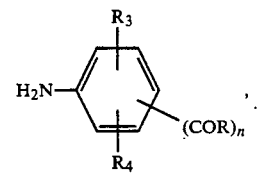

b) by diazotisation of an amine of the formula

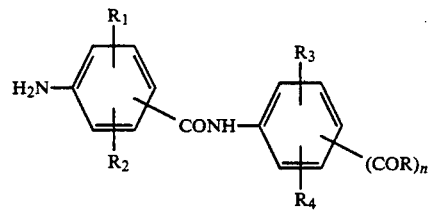

and subsequent coupling of the resulting diazo component with a coupling component of the formula

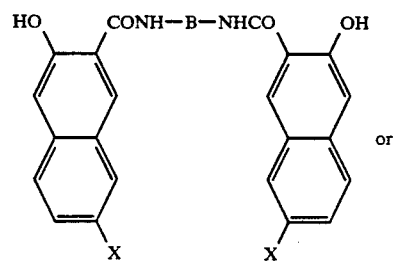

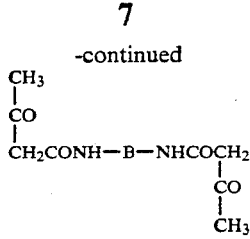

for example in accordance with U.S. Pat. No. 4,003,886, in which, in the abovementioned formulae the groups n, B, R, $R_1$ to $R_5$, Hal, $X_1$ and $X_2$ are as defined above.

The above coupling components are known intermediate products. In contrast, the above carboxylic acid halides based on β-hydroxynaphthoic acid, and their corresponding acids, are novel intermediate products. They can be obtained by known processes, for example in accordance with U.S. Pat. No. 4,689,403.

The invention thus furthermore relates to compounds of the following formula VII:

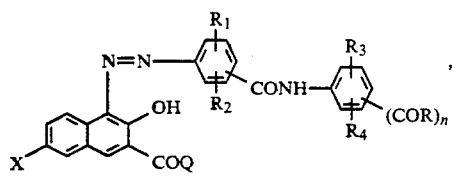

in which n is the number 1 or 2, R is a radical of the formula —$OR_5$ or —$NHR_5$, $R_1$ and $R_3$ independently of one another are —H or —Cl, $R_2$ and $R_4$ independently of one another are —H, halogen, —$NO_2$, —CN, $C_1$-$C_4$alkyl, $C_1$-$C_4$alkoxy, —$CF_3$, $C_2$-$C_5$alkoxycarbonyl, or —CONH-phenyl, —NHCO—phenyl or phenyloxy which is unsubstituted or substituted on the phenyl nucleus by one or two chlorine atoms or one or two methyl, methoxy or ethoxy groups, $R_5$ is alkyl having at least 10 C atoms, X is —H, —Br, —$OCH_3$, —CN or —$NO_2$ and Q is —OH or halogen, in particular —Cl.

For the meaning of $C_1$-$C_4$alkyl, $C_1$-$C_4$alkoxy, $C_2$-$C_5$alkoxycarbonyl and $R_5$, reference is made to the corresponding definitions already given above.

Preferred compounds of the formula VII have the formula VIII

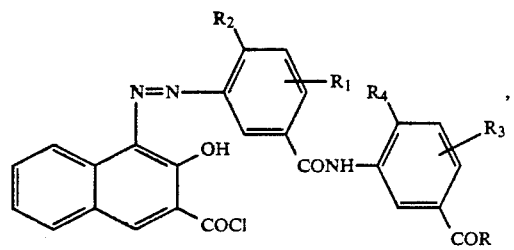

in which R, $R_1$, $R_2$, $R_3$ and $R_4$ are as defined above.

Particularly preferred compounds have the formula VIII in which $R_1$ and $R_3$ are —H, $R_2$ is —Cl, —$CH_3$ or —$OCH_3$, but in particular —Cl, $R_4$ is —Cl, —$CH_3$, $OCH_3$, —$COOCH_3$ or —$COOC_2H_5$, but in particular —Cl, and R is a radical of the formula —$OR_5$, in which $R_5$ is $C_{12}$-$C_{18}$alkyl.

A preferred preparation process is the condensation process according to the above equation a). The condensation is advantageously carried out in the presence of an organic inert solvent under normal or increased pressure, with or without a catalyst. Suitable solvents are, for example, toluene, chlorobenzene, dichlorobenzenes, such as o-dichlorobenzene, and furthermore trichlorobenzenes, nitrobenzene or mixtures of aromatic and/or aliphatic solvents, such as ®Shellsols.

However, the compounds of the formula I can also be prepared by a transesterification or amidation reaction, by transesterifying or transamidating a compound of the formula

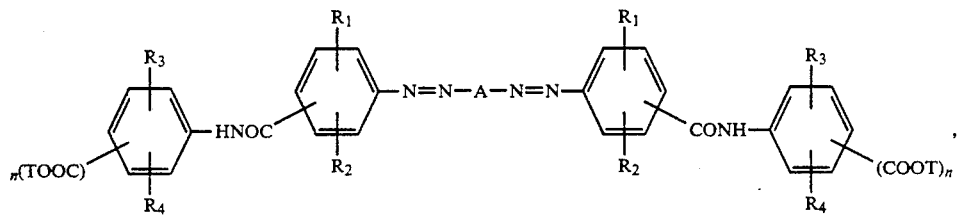

in which T is $C_1$-$C_3$alkyl and the other symbols n, A, $R_1$, $R_2$, $R_3$ and $R_4$ are as defined above, with an alcohol or an amine of the formula $R_5$—OH or $R_5NH_2$ by known processes to give compounds of the formula I. T is methyl, ethyl, propyl or isopropyl, but in particular methyl.

The reaction is advantageously carried out directly in an excess (as the solvent) of the corresponding long-chain alcohol or amine, or preferably in the presence of an inert organic solvent, for example toluene, xylenes, dichlorobenzenes, nitrobenzene, chloronaphthalene, anisole or ®Dowtherm, or ketones, such as cyclohexanone, at elevated temperature, for example in the boiling range of the solvent used, under normal pressure or under pressure, with or without catalysts. If catalysts are employed, sulfuric acid, p-toluenesulfonic acid, methylsulfonic acid, LiH, $LiNH_2$, $NaOCH_3$, KO-tert-butylate, tetraalkyl titanates, dibutyltin oxide or rare earths, for example, are suitable.

The resulting compounds of the formula I are isolated in the customary manner, for example by filtration, and the resulting material on the suction filter is washed with one of the solvents already mentioned above and then advantageously also with water. These compounds are in general obtained in a good yield and purity and can be used in the finely divided form, without further purification, for example for colouring high molecular weight organic material.

If their purity and/or particle shape and size are not yet suitable or the optimum for use as pigments, the compounds according to the application can be conditioned further. Conditioning is understood as meaning the preparation of a fine particle shape and size which is optimum for the application, for example by dry grinding with or without salt, by solvent or aqueous grinding or by salt kneading, or by a subsequent thermal solvent treatment.

Thermal solvent treatments can be carried out, for example, in organic solvents, preferably with those which boil above 100° C.

Solvents which have proved to be particularly suitable for this are benzenes which are substituted by halogen atoms or alkyl or nitro groups, such as toluene, chlorobenzene, o-dichlorobenzene, xylenes or nitrobenzene, alcohols, such as isopropanol or isobutanol, and furthermore ketones, such as cyclohexanone, ethers, such as ethylene glycol monomethyl or monoethyl ether, amides, such as dimethylformamide or N-methylpyrrolidone, as well as dimethyl sulfoxide, sulfolane or water by itself, if appropriate under pressure. The aftertreatment can also be carried out in water in the presence of organic solvents and/or with the addition of surface-active substances or aliphatic amines, or in liquid ammonia.

It may be advantageous, depending on the conditioning process and/or intended application, for certain amounts of texture-improving agents to be added to the compound of the formula I according to the application before or after the conditioning process. Such agents are, in particular, fatty acids having at least 18 C atoms, for example stearic or behenic acid or amides or metal salts thereof, in particular Mg salts, as well as plasticisers, waxes, resin acids, such as abietic acid, colophony soap, alkylphenols or aliphatic alcohols, such as stearyl alcohol, or vicinal diols, such as dodecane-1,2-diol, and furthermore modified colophony maleate resins or fumaric acid colophony resins. The texture-improving agents are preferably added in amounts of 0.1–30% by weight, in particular 2–15% by weight, based on the end product.

High molecular weight organic material can be of natural or synthetic origin. It can be, for example, naturally occurring resins or drying oils, rubber or casein, or modified naturally occurring substances, such as chlorinated rubber, oil-modified alkyd resins or viscose, cellulose ethers or esters, such as cellulose acetate, cellulose propionate, cellulose acetobutyrate or nitrocellulose, but in particular entirely synthetic organic polymers (thermosets and thermoplastics), such as are obtained by polymerisation, polycondensation or polyaddition. Examples from the class of polymerisation resins are, in particular: polyolefins, such as polyethylene, polypropylene or polyisobutylene, and furthermore substituted polyolefins, such as polymers of vinyl chloride, vinyl acetate, styrene, acrylonitrile, acrylic acid esters and/or methacrylic acid esters or butadiene, as well as copolymers of the monomers mentioned, in particular ABS, EVA or acrylic-styrene-acrylonitrile (ASA).

Examples from the series of polyaddition resins and polycondensation resins are the condensation products of formaldehyde with phenols, the so-called phenoplasts, and the condensation products of formaldehyde with urea, thiourea and melamine, the so-called aminoplasts, the polyesters used as surface coating resins, and in particular both saturated resins, for example alkyd resins, and unsaturated resins, for example maleate resins, and furthermore the linear polyesters, polycarbonates, polyurethanes and polyamides or silicones. Particularly good colourings are obtained with alkyd/melamine resins.

The high molecular weight compounds mentioned can be present individually or in mixtures, as plastics or as melts, which can be spun to fibres if appropriate.

They can also be present in the polymerised state in dissolved form as film-forming agents or binders for varnishes or printing inks, for example boiled linseed oil, nitrocellulose, alkyd resins, melamine resins and urea-formaldehyde resins or acrylic resins.

The pigmenting of the high molecular weight organic substances with the compounds of the formula I of the type defined is carried out, for example, by mixing such a compound, if appropriate in the form of masterbatches, with these substrates using roll mills or mixing or grinding apparatuses. The pigmented material is then brought into the desired final form by known processes, such as calendering, pressing, extrusion, brushing, spinning, casting or injection moulding. It is often desirable to incorporate so-called plasticisers into the high molecular weight compounds before shaping in order to produce non-rigid mouldings or to reduce their brittleness. Such plasticisers which can be used are, for example, esters of phosphoric acid, phthalic acid or sebacic acid. The plasticisers can be incorporated into the polymers before or after incorporation of the pigment. It is furthermore possible also to add to the high molecular weight organic substances, in addition to the compounds according to the invention, any desired amount of fillers or other colouring constituents, such as white, coloured or black pigments, for the purpose of achieving various colour shades.

For pigmenting varnishes and printing inks, the high molecular weight organic materials and the compounds of the formula I, if appropriate together with additives, such as fillers, other pigments, drying agents or plasticisers, are finely dispersed or dissolved in a common organic solvent or solvent mixture. A procedure can be followed here in which the individual components by themselves or several together are dispersed or dissolved and only then are all the components brought together.

The high molecular weight organic substances preferably contain 0.01–20% by weight of a compound of the formula of the type defined, for example in plastics, fibres, varnishes and printing inks.

However, the compounds of the formula I are preferably employed for colouring polyolefins.

Examples of polyolefins are high and low density polyethylene (HD-PE, LD-PE and LLD-PE), polypropylene and polyisobutylene, as well as copolymers of polyolefins with, for example, polyethers, polyetherketones or polyurethanes.

The colouring is carried out by customary processes, for example by mixing a compound of the formula I with the polyolefin granule or powder and extruding the mixture to give fibres, films or granules. The latter can then be shaped to objects by the injection moulding process.

The resulting colourings in general have a yellow to red colour shade. The yellow products have proved to be particularly suitable.

The resulting colourings have a high purity and high saturation and are distinguished by an excellent dispersibility, by a good general resistance, for example fastness to overspraying, migration, weathering and in particular heat and light, and by an excellent fastness to blooming. A particular advantage of polyethylene objects coloured with the compounds of the formula I according to the invention is that, especially in the case of HD-PE, they do not have an increased tendency to exhibit distortion and deformation phenomena. They moreover have a high acid resistance and are also deep in colour.

The fibres of plastic, for example PP fibres, mass-coloured with the compounds of the formula I according to the invention have excellent textile properties, for example light and wet fastness in the presence of detergents and solvents.

The following examples serve to illustrate the invention.

EXAMPLE 1

3.55 g of the disazodicarboxylic acid dichloride of the formula

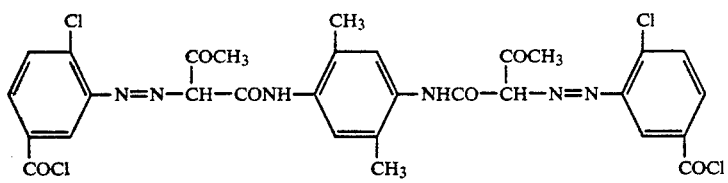

and 4.05 g of stearyl 4-methyl-3-amino-benzoate are heated to 133° C. in a mixture of 160 ml of dried o-dichlorobenzene and 2 ml of pyridine and the mixture is stirred at this temperature for 18 hours. The ochre-yellow streaky mass formed is cooled to 80° C., and 160 ml of ethanol (98%) are added. The temperature falls to 50° C., an ochre-yellow suspension being formed from the reaction mass. The product is filtered off with suction, and the material on the suction filter is washed with 100 ml of ethanol and suspended briefly (using a mixer) in a mixture of 100 ml of ethanol and 100 ml of 5% aqueous ammonia solution. The product is filtered off again with suction and dried in vacuo at 60° C. The yield is 6.5 g (90.4% of theory). The orange powder has the formula During this addition, the temperature rises to 66° C. The brown suspension formed is heated to 90° C., stirred at this temperature for 4 hours, allowed to cool to room temperature and filtered through a Hyflo layer. The clear dark orange filtrate is cooled to 5° C., and 500 ml of petroleum ether are added. The precipitate which has separated out is filtered off through a fabric filter, pressed off and suspended in 800 ml of 50% ethanol (mixer). The resulting suspension is filtered off with suction and the material on the suction filter is then dried in vacuo at 50° C. 194.5 g (89.7% of theory) of a pale yellow powder of melting point 66° C. which has the following combustion analysis are obtained: Calculated (in %): C 72.01; H 9.98; N 3.23. Found (in %): C 72.06; H 9.91; N 3.27.

b) Stearyl 4-methyl-3-amino-benzoate: 42 g of stearyl 4-methyl-3-nitro-benzoate are hydrogenated with 6.52 liters of hydrogen (theory: 6.73 l, 96.9%) in 400 ml of dioxane in the presence of 8.5 g of Raney nickel. The resulting solution is clarified by filtration from the Raney nickel. The dark brown filtrate is poured onto 1500 ml of water. The beige precipitate which has separated out is filtered off through a fabric filter, washed with 250 ml of water, pressed off and dried in vacuo at 50° C. The yield of the slightly beige powder of melting point 79° C. is 38.2 g (94.65% of theory).

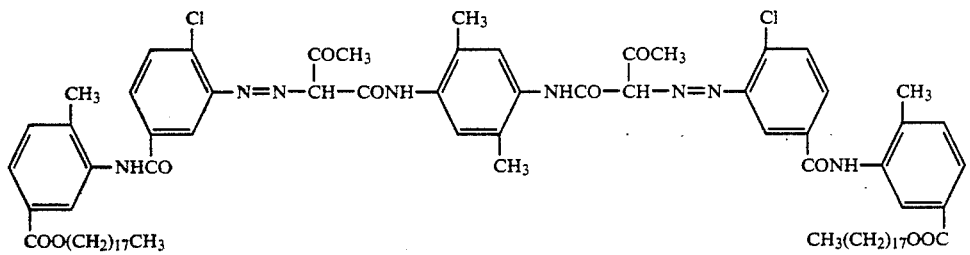

and exhibits the following combustion analysis: Calculated (in %): C 68.35; H 7.84; Cl 4.92; N 7.78. Found (in %): C 68.18; H 7.72; Cl 4.96; N 7.90.

This product colours polyvinyl chloride, polyethylene and polyamide in deep yellow shades of excellent resistance to heat, migration and light. An AM coloured coating obtained with this product is weatherproof.

Preparation of the starting material required (stearyl 4-methyl-3-amino-benzoate)

a) Stearyl 4-methyl-3-nitrobenzoate: 133 g of stearyl alcohol (97%) are dissolved in a mixture of 700 ml of chlorobenzene and 62 ml of pyridine at 35° C. 101 g of 4-methyl-3-nitro-benzoyl chloride are added to the clear colourless solution in the course of 2 minutes.

Combustion analysis: Calculated (in %): C 77.37; H 11.24; N 3.47. Found (in %): C 77.34; H 11.11; N 3.39.

EXAMPLES 2-21

The following table describes further compounds which can be prepared by the process of the above Example 1 by coupling the diazo compound of an amine listed in column I to the bisacetoacetic acid arylide of the diamine listed in column II, converting the disazo dye dicarboxylic acid thus obtained into its corresponding dicarboxylic acid dichloride and then subjecting this to a condensation reaction with an amine of column III. Column IV shows the colour shade of PVC film coloured with these pigments.

| Ex. | I | II | III | IV |
|---|---|---|---|---|
| 2 | 4-Methyl-3-amino-benzoic acid | 2,5-Dimethyl-p-phenylenediamine | Stearyl 4-methyl-3-amino-benzoate | yellow |
| 3 | 4-Chloro-3-amino-benzoic acid | 2-Chloro-5-methyl-p-phenylenediamine | Stearyl 4-methyl-3-amino-benzoate | green-yellow |

-continued

| Ex. | I | II | III | IV |
|---|---|---|---|---|
| 4 | 4-Chloro-3-amino-benzoic acid | 2,5-Dimethyl-p-phenyl-enediamine | 4-Methyl-3-amino-benzoic acid stearylamide | yellow |
| 5 | 4-Chloro-3-amino-benzoic acid | 2,5-Dimethyl-p-phenyl-enediamine | n-Tetradecanyl 4-methyl-3-amino-benzoate | green-yellow |
| 6 | 4-Chloro-3-amino-benzoic acid | 2,5-Dimethyl-p-phenyl-enediamine | Stearyl 3-amino-benzoate | yellow |
| 7 | 4-Chloro-3-amino-benzoic acid | 2,5-Dimethyl-p-phenyl-enediamine | n-Decanyl 4-methyl-3-amino-benzoate | yellow |
| 8 | 4-Chloro-3-amino-benzoic acid | 2,5-Dimethyl-p-phenyl-enediamine | Lauryl 4-methyl-3-amino-benzoate | yellow |
| 9 | 4-Chloro-3-amino-benzoic acid | 2,5-Dimethyl-p-phenyl-enediamine | Stearyl 4-methoxy-3-amino-benzoate | yellow |
| 10 | 4-Chloro-3-amino-benzoic acid | 2,5-Dimethyl-p-phenyl-enediamine | Distearyl 2-amino-terephthalate | yellow |
| 11 | 4-Chloro-3-amino-benzoic acid | 2,5-Dimethyl-p-phenyl-enediamine | Stearyl 4-chloro-3-amino-benzoate | green-yellow |
| 12 | 4-Chloro-3-amino-benzoic acid | 2,5-Dimethyl-p-phenyl-enediamine | 4-Amino-benzoic acid stearylamide | orange-yellow |
| 13 | 4-Chloro-3-amino-benzoic acid | 2,5-Dimethyl-p-phenyl-enediamine | 4-Stearoylaminoaniline | orange-yellow |
| 14 | 4-Chloro-3-amino-benzoic acid | 2,5-Dichloro-p-phenyl-enediamine | Stearyl anthranilate | green-yellow |
| 15 | 4-Chloro-3-amino-benzoic acid | 2,5-Dichloro-p-phenyl-enediamine | Anthranilic acid stearyl-amide | green-yellow |
| 16 | 4-Chloro-3-amino-benzoic acid | 2,5-Dichloro-p-phenyl-enediamine | 4-Carbomethoxy-3-amino-benzoic acid stearylamide | green-yellow |
| 17 | 4-Chloro-3-amino-benzoic acid | 2,5-Dichloro-p-phenyl-enediamine | Lauryl 4-carbomethoxy-3-amino-benzoate | yellow |
| 18 | 4-Chloro-3-amino-benzoic acid | 2,5-Dimethyl-p-phenyl-enediamine | Anthranilic acid stearyl-amide | yellow |
| 19 | 4-Chloro-3-amino-benzoic acid | 2,5-Dimethyl-p-phenyl-enediamine | Stearyl 4-carbomethoxy-3-amino-benzoate | yellow |
| 20 | 4-Chloro-3-amino-benzoic acid | 2-Chloro-5-methyl-p-phenylenediamine | Stearyl 4-carbomethoxy-3-amino-benzoate | yellow |
| 21 | 4-Chloro-3-amino-benzoic acid | 2-Chloro-5-methyl-p-phenylenediamine | Anthranilic acid stearyl-amide | green-yellow |
| 22 | 4-Chloro-3-amino-benzoic acid | 2-Chloro-5-methyl-p-phenylenediamine | 4-Methyl-3-amino-benzoic acid stearylamide | green-yellow |
| 23 | 4-Chloro-3-amino-benzoic acid | 2-Chloro-5-methyl-p-phenylenediamine | n-Tetradecanyl 4-methyl-2-amino-benzoate | green-yellow |
| 24 | 4-Chloro-3-amino-benzoic acid | 2-Chloro-5-methyl-p-phenylenediamine | Stearyl 3-amino-benzoate | green-yellow |
| 25 | 4-Chloro-3-amino-benzoic acid | 2-Chloro-5-methyl-p-phenylenediamine | n-Decanyl 4-methyl-3-amino-benzoate | green-yellow |
| 26 | 4-Chloro-3-amino-benzoic acid | 2-Chloro-5-methyl-p-phenylenediamine | Lauryl 4-methyl-3-amino-benzoate | green-yellow |
| 27 | 4-Chloro-3-amino-benzoic acid | 2-Chloro-5-methyl-p-phenylenediamine | Stearyl 4-methoxy-3-amino-benzoate | green-yellow |
| 28 | 4-Chloro-3-amino-benzoic acid | 2-Chloro-5-methyl-p-phenylenediamine | Distearyl 2-amino-terephthalate | green yellow |
| 29 | 4-Chloro-3-amino-benzoic acid | 2-Chloro-5-methyl-p-phenylenediamine | Stearyl 4-chloro-3-amino-benzoate | green-yellow |
| 30 | 4-Chloro-3-amino-benzoic acid | 2-Chloro-5-methyl-p-phenylenediamine | 4-Amino-benzoic acid stearylamide | green-yellow |
| 31 | 4-Chloro-3-amino-benzoic acid | 2-Chloro-5-methyl-p-phenylenediamine | 4-Stearoylaminoaniline | yellow |
| 32 | 4-Chloro-3-amino-benzoic acid | 2,5-Dichloro-p-phenylenediamine | 4-Methyl-3-amino-benzoic acid stearylamide | green-yellow |
| 33 | 4-Chloro-3-amino-benzoic acid | 2,5-Dichloro-p-phenylenediamine | n-Tetradecanyl 4-methyl-3-amino-benzoate | green-yellow |
| 34 | 4-Chloro-3-amino-benzoic acid | 2,5-Dichloro-p-phenylenediamine | Stearyl 3-amino-benzoate | green-yellow |
| 35 | 4-Chloro-3-amino-benzoic acid | 2,5-Dichloro-p-phenylenediamine | n-Decanyl 4-methyl-3-amino-benzoate | green-yellow |
| 36 | 4-Chloro-3-amino-benzoic acid | 2,5-Dichloro-p-phenylenediamine | Lauryl 4-methyl-3-amino-benzoate | green-yellow |
| 37 | 4-Chloro-3-amino-benzoic acid | 2,5-Dichloro-p-phenylenediamine | Stearyl 4-methoxy-3-amino-benzoate | green-yellow |
| 38 | 4-Chloro-3-amino-benzoic acid | 2,5-Dichloro-p-phenylenediamine | Distearyl 2-amino-terephthalate | green-yellow |
| 39 | 4-Chloro-3-amino-benzoic acid | 2,5-Dichloro-p-phenylenediamine | Stearyl 4-chloro-3-amino-benzoate | green-yellow |
| 40 | 4-Chloro-3-amino-benzoic acid | 2,5-Dichloro-p-phenylenediamine | 4-Aminobenzoic acid stearylamide | green-yellow |
| 41 | 4-Chloro-3-amino-benzoic acid | 2,5-Dichloro-p-phenylenediamine | 4-Stearoylaminoaniline | green-yellow |
| 42 | 4-Carbomethoxy-3-amino-benzoic acid | 2,5-Dimethoxy-p-phenylenediamine | Stearyl 4-carbomethoxy-3-amino-benzoate | yellow |
| 43 | 4-Chloro-3-amino- | 2,5-Dimethyl-p- | Lauryl anthranilate | yellow |

| Ex. | I | II | III | IV |
|---|---|---|---|---|
| | benzoic acid | phenylenediamine | | |

EXAMPLE 44

6 g of stearyl 3-(3'-amino-4'-methoxy-benzoylamino)-4-methylbenzoate and 1.7 g of 2,5-dichloro-1,4-diacetoacetylamino-benzene are heated to 70° in a solution of 120 ml of o-dichlorobenzene and 12 ml of glacial acetic acid. A slightly cloudy yellow solution is formed. 1.46 ml of tert-butyl nitrite are added in the course of 10 seconds. A thick yellow precipitate separates out and the temperature rises to 72°. The suspension is heated at 117°. The gelatinous ochre-yellow suspension is stirred at this temperature for a further hour and cooled to 80°, and 120 ml of alcohol are added. The temperature drops to 40°. The yellow precipitate is filtered off with suction at 40°, washed with 250 ml of alcohol and dried in vacuo at 60°. 6.3 g (86.1% of theory) of an intensely yellow powder of the formula are obtained.

Analysis: Calculated (in %): C 66.88; H 7.67; Cl 4.81; N 7.61. Found (in %): C 66.83; H 7.89; Cl 4.83; N 7.61.

EXAMPLES 45–48

The following table describes further compounds which are obtained by coupling the diazotised bases according to column I with a bisacetoacetic acid arylide of a diamine of column II in a molar ratio of 2:1. Column III shows the colour shade of PVC film coloured with these pigments.

| Ex. | I | II | III |
|---|---|---|---|
| 45 | Stearyl 3-(3'-amino-4'-methoxy-benzoyl-amino)-4-methyl-benzoate | 2-Chloro-5-methyl-p-phenylenediamine | green-yellow |
| 46 | Stearyl 3-(3'-amino-4'-methoxy-benzoyl-amino)-4-methyl-benzoate | 2,5-Dimethyl-p-phenylenediamine | yellow |
| 47 | Stearyl 3-(3'-amino-4'-chloro-benzoyl-amino)-4-methyl-benzoate | 2,5-Dimethyl-p-phenylenediamine | yellow |
| 48 | Stearyl 3-(3'-amino-4-methyl-benzoyl-amino)-4-methyl-benzoate | 2,5-Dimethoxy-p-phenylenediamine | orange |

EXAMPLE 49

If the procedure is the same as in Example 1, but instead of the disazodicarboxylic acid dichloride mentioned in that example, a corresponding amount of the disazodicarboxylic acid dichloride of the formula

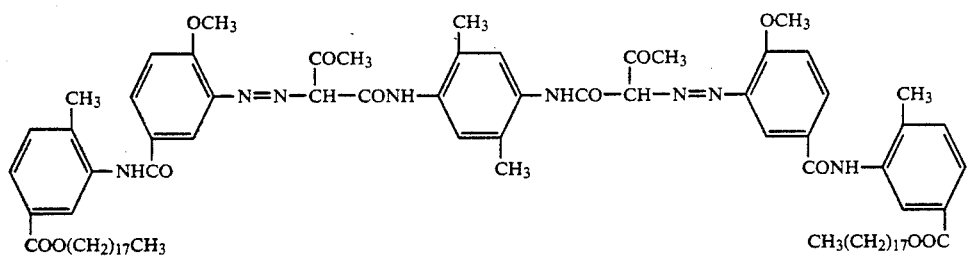

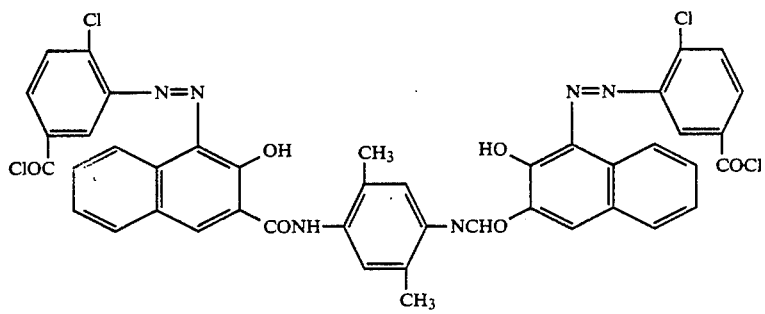

is employed, a red powder of the following formula

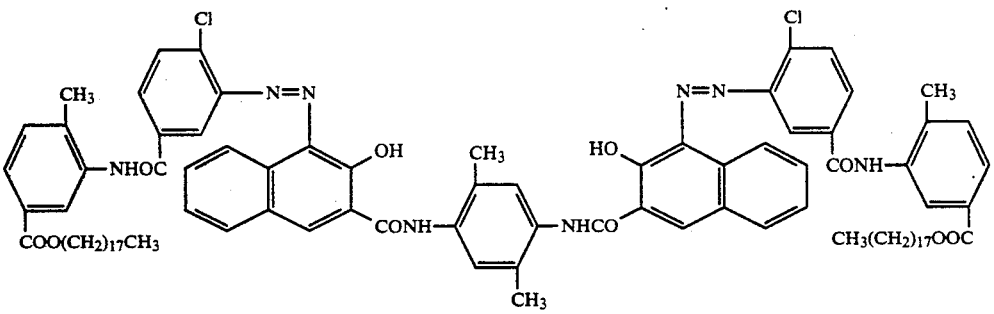

is obtained.

It colours polyvinyl chloride in fast red shades.

EXAMPLES 50-57

The following table describes further compounds which can be prepared by the process of the above Example 49 by coupling the diazo compound of an amine listed in column I to the bisnaphthol-arylide of the diamine listed in column II, converting the disazo dye dicarboxylic acid thus obtained into its corresponding dicarboxylic acid dichloride and then subjecting this to a condensation reaction with an amine of column III. Column IV shows the colour shade of the PVC film coloured with these pigments.

| Ex. | I | II | III | IV |
|---|---|---|---|---|
| 50 | 4-Methyl-3-amino-benzoic acid | 2,5-Dimethyl-p-phenylenediamine | Stearyl 4-methyl-3-amino-benzoate | red |
| 51 | 4-Chloro-3-amino-benzoic acid | 2,5-Dimethyl-p-phenylenediamine | n-Tetradecanyl 4-methyl-3-amino-benzoic acid | brown-red |
| 52 | 4-Chloro-3-amino-benzoic acid | 2,5-Dimethyl-p-phenylenediamine | Stearyl 3-amino-benzoate | red |
| 53 | 4-Chloro-3-amino-benzoic acid | 2,5-Dimethyl-p-phenylenediamine | n-Decanyl 4-methyl-3-amino-benzoate | brown-red |
| 54 | 4-Chloro-3-amino-benzoic acid | 2,5-Dimethyl-p-phenylenediamine | Stearyl 4-methoxy-3-amino-benzoate | red |
| 55 | 4-Chloro-3-amino-benzoic acid | 2,5-Dimethyl-p-phenylenediamine | Stearyl 4-amino-benzoate | brown-red |
| 56 | 4-Chloro-3-amino-benzoic acid | 2,5-Dimethyl-p-phenylenediamine | 4-Stearoylamino-aniline | brown-red |
| 57 | 4-Methyl-3-amino-benzoic acid | 2-Chloro-5-methyl-p-phenylenediamine | Stearyl 4-methyl-3-amino-benzoate | red |

EXAMPLE 58

A mixture of 1.0 g of the diazo condensation pigment obtained according to Example 1, 1.0 g of the antioxidant ®IRGANOX 1010 (CIBA-GEIGY AG) and 1000 g of polyethylene HD granules (®VESTOLEN A60-16, HÜLS) is premixed in a 3 l glass bottle on a roller bench for 15 minutes. The mixture is then extruded twice through a single-screw extruder. The granules thus obtained are then injection-moulded to sheets on an injection-moulding machine (®Allround Aarburg 200) at 250° C. with a dwell time of 5 minutes. The sheets thus obtained exhibit uniformly deep yellow colourings of high purity and excellent resistance to light.

EXAMPLE 59

40 mg of the disazo condensation pigment obtained according to Example 1 are mixed thoroughly with 7.3 ml of dioctyl phthalate and 13.3 g of a stabilised polyvinyl chloride of the type ®LONZA E-722 in a glass beaker using a glass rod. The resulting mixture is then processed to a thin film on a roll mill at 160° C. for 5 minutes. The PVC film thus produced exhibits a very deep yellow colouring of high purity and very good resistance to light. The dispersibility of the pigment is excellent.

EXAMPLE 60

1000 g of polypropylene granules (®DAPLEN PT-55, Chemie LINZ) and 1.0 g of disazo condensation pigment obtained according to Example 1 are mixed in a 3 l bottle on a roller bench for 15 minutes. The mixture is then extruded twice through a single-screw extruder and subsequently granulated. The resulting granules are spun by the melt spinning process at 280°-285° C. The yellow fibres coloured in this way exhibit a very good resistance to light and excellent textile fastness, such as rubbing- and wet-fastnesses in the presence of detergents and solvents. The heat resistance of the pigments during the spinning process at 285° C. is excellent.

EXAMPLE 61

100 g of the polyamide ®GRILON A 25 (EMS-Chemie, AG, Zürich) and 0.2 g of the disazo condensation pigment obtained according to Example 1 are mixed thoroughly in a laboratory turbo mixer (W. A. Bachofen, Basle) for 20 minutes. The mixture is then extruded on a single-screw extruder at 240° C. The web thus obtained exhibits a yellow coloration and shows good resistances to light.

EXAMPLE 62

If the procedure is analogous to that described in Example 58, but 10 g of titanium dioxide ®KRONOS RN-57-P (KRONOS Titan GmbH) are used in addition to the coloured pigment, yellow pressed sheets with equally good heat resistances are obtained. The pressed sheets injection-moulded at between 200° and 280° C. exhibit no deviations in colour after cooling.

What is claimed is:

1. A compound of the formula I

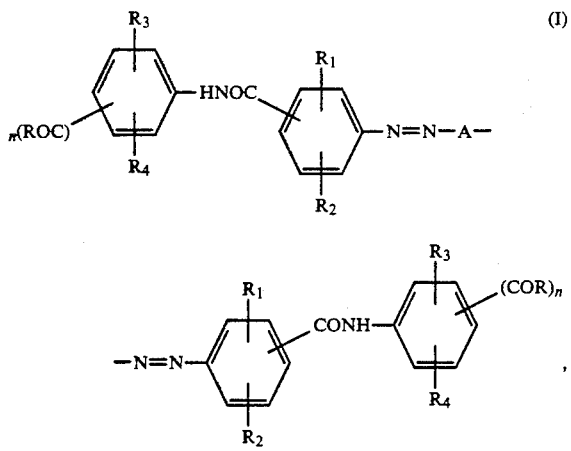

in which R is a radical of the formula $-OR_5$ or $-NHR_5$, A is a radical of the formula II or III

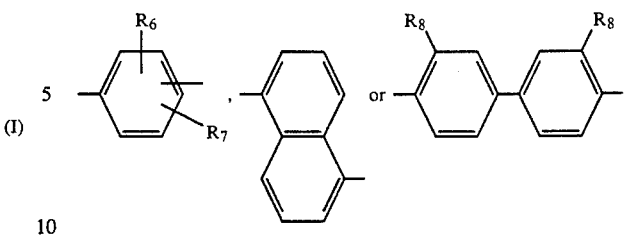

in which n is the number 1 or 2, $R_1$ and $R_3$ independently of one another are —H or Cl, $R_2$ and $R_4$ independently of one another are —H, halogen, $-NO_2$, —CN, $C_1-C_4$alkyl, $C_1-C_4$alkoxy, $-CF_3$, $C_2-C_5$alkoxycarbonyl, or —CONH—phenyl, —NHCO—phenyl or phenyloxy which is unsubstituted or substituted on the phenyl nucleus by one or two chlorine atoms or one or two methyl, methoxy or ethoxy groups, $R_5$ is alkyl having at least 10 C atoms, $R_6$ and $R_7$ independently of one another are —H, halogen, $-NO_2$, —CN, $-CF_3$, $C_1-C_4$alkyl or $C_1-C_4$alkoxy, $R_8$ is —H, —Cl, —Br, $-CH_3$ or $-OCH_3$ and X is —H, —Br, $-OCH_3$, —CN or $-NO_2$.

2. A compound according to claim 1, in which the formula I has the following structure

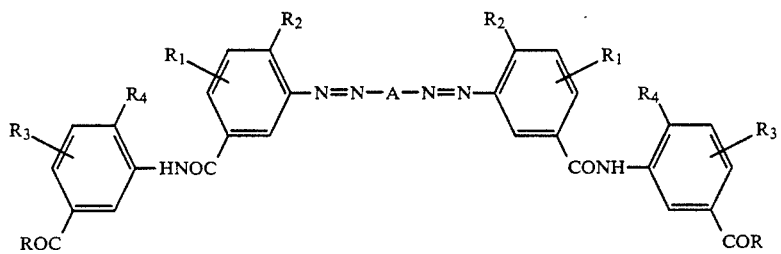

and the groups R, $R_1$, $R_2$, $R_3$, $R_4$ and A are as defined in claim 1.

3. A compound according to claim 1, in which the formulae II and III have the following structures

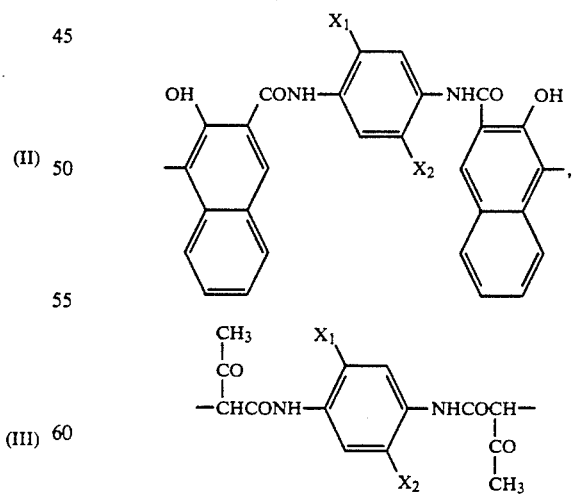

and the groups $X_1$ and $X_2$ independently of one another are —H, halogen, $-NO_2$, —CN, $-CF_3$, $C_1-C_4$alkyl or $C_1-C_4$alkoxy.

4. A compound according to claim 1, which has the formula IV

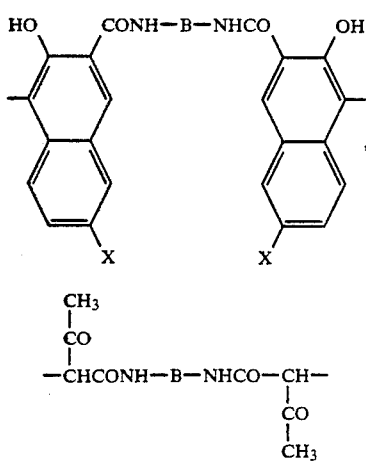

in which B is a radical of the formula

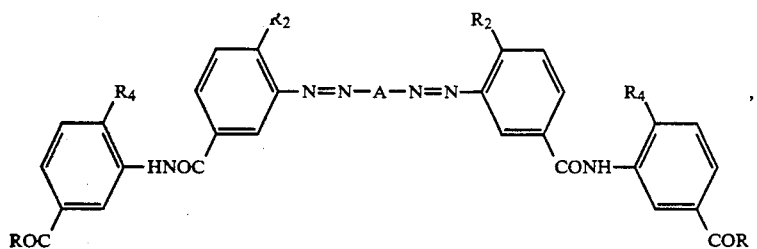

(IV)

in which A is a radical of the formula V or VI

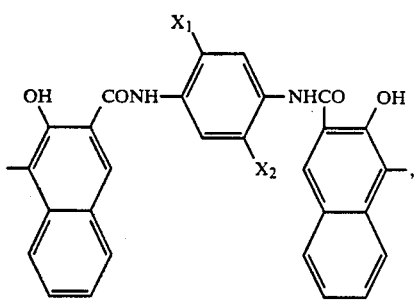

(V)

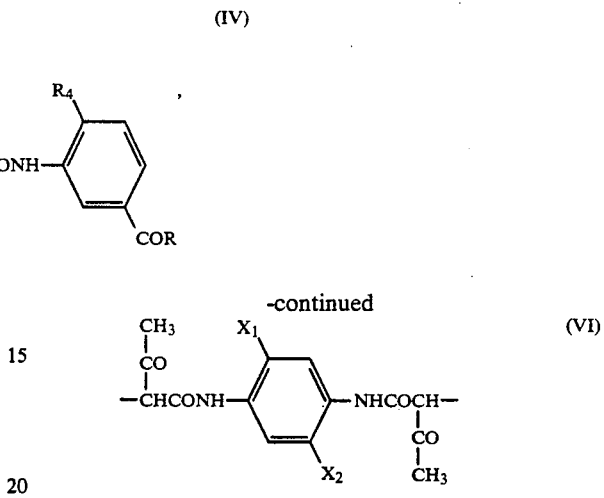

in which R is a radical of the formula $-OR_5$ or $-NHR_5$, $R_2$ and $R_4$ independently of one another are $-H$, $-Cl$, $-CH_3$, $-OCH_3$, $-OC_2H_5$, $-COOCH_3$, $-COOC_2H_5$ or $-OC_6H_5$, $R_5$ is $C_{12}-C_{35}$alkyl and $X_1$ and $X_2$ independently of one another are $-H$, $-Cl$, $-CH_3$, $-OCH_3$ or $-OC_2H_5$.

5. A compound according to claim 4 in which R is a radical of the formula $-OR_5$ and the other radicals are as defined in claim 4.

6. A compound according to claim 4, in which A is a radical of the formula V and the other groups are as defined in claim 4.

7. A compound according to claim 4, in which A is a radical of the formula V, $R_2$ is $-Cl$, $-CH_3$ or $-OCH_3$, $R_4$ is $-Cl$, $CH_3$, $-OCH_3$, $-COOCH_3$ or $-COOC_2H_5$, $R_5$ is $C_{12}-C_{18}$alkyl and $X_1$ and $X_2$ independently of one another are $-H$, $-Cl$, $-CH_3$ or $-OCH_3$.

* * * * *